(12) United States Patent
Dunaway et al.

(10) Patent No.: US 7,401,843 B2
(45) Date of Patent: Jul. 22, 2008

(54) RECREATIONAL VEHICLE ROOFING COATING

(75) Inventors: James Hubert Dunaway, Cuyahoga Falls, OH (US); Christopher Angelo DelaCruz, Cleveland Heights, OH (US); Craig Anthony Erichsen, Granger, IN (US)

(73) Assignee: Tremco Incorporated, Beachwood, OH (US)

( * ) Notice: Subject to any disclaimer, the term of this patent is extended or adjusted under 35 U.S.C. 154(b) by 361 days.

(21) Appl. No.: 10/897,987

(22) Filed: Jul. 23, 2004

(65) Prior Publication Data

US 2005/0035626 A1 Feb. 17, 2005

Related U.S. Application Data

(60) Provisional application No. 60/489,822, filed on Jul. 24, 2003.

(51) Int. Cl.
*B62D 25/06* (2006.01)

(52) U.S. Cl. ...................................... 296/156; 296/210

(58) Field of Classification Search ................ 296/156, 296/210, 214, 216.06, 164
See application file for complete search history.

(56) References Cited

U.S. PATENT DOCUMENTS

| 3,496,689 | A | * | 2/1970 | Nerem ........................ 296/164 |
| 4,218,500 | A | * | 8/1980 | Radisch ....................... 428/78 |
| 4,299,868 | A | | 11/1981 | Berndt et al. |
| 4,461,788 | A | | 7/1984 | Wyman |
| 4,712,287 | A | * | 12/1987 | Johnston ..................... 29/469 |
| 4,785,035 | A | | 11/1988 | Palluel et al. |
| 4,985,155 | A | * | 1/1991 | Yamada et al. ............. 252/8.62 |
| 5,002,820 | A | * | 3/1991 | Bolton et al. ............... 428/215 |
| 5,024,875 | A | * | 6/1991 | Hill et al. ....................... 442/77 |
| 5,126,170 | A | | 6/1992 | Zwiener et al. |
| 5,212,242 | A | | 5/1993 | Gross et al. |
| 5,314,945 | A | | 5/1994 | Nickle et al. |
| 5,385,774 | A | | 1/1995 | Cramer et al. |
| 5,472,290 | A | * | 12/1995 | Hulls ......................... 403/393 |
| 5,489,704 | A | | 2/1996 | Squiller et al. |
| 5,622,580 | A | * | 4/1997 | Mannheim .................. 156/106 |
| 5,652,300 | A | | 7/1997 | Morikawa et al. |
| 5,783,307 | A | | 7/1998 | Fagerburg et al. |
| 5,852,105 | A | | 12/1998 | Wustefeld et al. |
| 5,855,832 | A | * | 1/1999 | Clausi ........................ 264/109 |
| 5,981,660 | A | | 11/1999 | Mitsumune et al. |
| 6,042,173 | A | * | 3/2000 | Nett ....................... 296/100.06 |
| 6,130,286 | A | | 10/2000 | Thomas et al. |
| 6,302,471 | B1 | * | 10/2001 | Windpassinger et al. ..................... 296/107.11 |

(Continued)

OTHER PUBLICATIONS

"Elixir Industries Roof Coating Product Information", printed Jun. 28, 2004, from http://www.elixirind.com/product.php?pid=35&print=true.

(Continued)

*Primary Examiner*—D. Glenn Dayoan
*Assistant Examiner*—Greg Blankenship
(74) *Attorney, Agent, or Firm*—Calfee, Halter & Griswold LLP

(57) ABSTRACT

Recreational vehicle roofing coatings, recreational vehicle roofs, recreational vehicles, and methods of waterproofing recreational vehicle roofs are provided. The recreational vehicle roofs have polyurethane coatings that are single layer coatings that form waterproofing membranes on the recreational vehicle roof. The coatings can be applied to a recreational vehicle roof before or after the installation of the roof on the vehicle.

15 Claims, 2 Drawing Sheets

U.S. PATENT DOCUMENTS

| | | | |
|---|---|---|---|
| 6,362,273 B1 | 3/2002 | Martin et al. | |
| 6,383,644 B2 * | 5/2002 | Fuchs | 428/424.8 |
| 6,416,854 B2 * | 7/2002 | Hunter, Jr. | 428/319.1 |
| 6,490,788 B2 * | 12/2002 | Carter et al. | 29/854 |
| 6,506,842 B1 | 1/2003 | Heck et al. | |
| 6,558,748 B2 | 5/2003 | Ou et al. | |
| 6,559,265 B2 * | 5/2003 | Lamers et al. | 528/45 |
| 6,559,270 B1 | 5/2003 | Siclovan et al. | |
| 6,607,831 B2 * | 8/2003 | Ho et al. | 428/423.1 |
| 6,723,771 B2 | 4/2004 | Palinkas et al. | |
| 2002/0055603 A1 | 5/2002 | Figge et al. | |
| 2002/0107354 A1 | 8/2002 | Smith et al. | |
| 2002/0114925 A1 * | 8/2002 | Balz et al. | 428/151 |
| 2003/0009049 A1 | 1/2003 | Smith et al. | |

OTHER PUBLICATIONS

"Liquid Roof Technical Specifications", printed Jul. 15, 2004, from http://www.inkproducts.com/liquid—roof technical.htm.

Guan, "One Hundred Percent Solids Aliphatic Polyurethane Coatings—From Dream to Reality", Urethanes Technology (Jun./Jul. 1997) p. 29.

* cited by examiner

RECREATIONAL VEHICLE ROOFING COATING

CROSS REFERENCE TO RELATED APPLICATION

The present application claims priority to U.S. Provisional Patent Application No. 60/489,822 filed Jul. 24, 2003, which is incorporated by reference herein in its entirety.

BACKGROUND OF THE INVENTION

The present invention relates to recreational vehicle roofing coatings and, in particular, to recreational vehicles and recreational vehicle roofs having coatings. The present invention further relates to methods of waterproofing recreational vehicle roofs.

Recreational vehicles can be exposed to a variety of weather conditions during their normal use. For example, recreational vehicles can encounter low temperatures, snow, and heavy rain. Therefore, recreational vehicles roofs need to be properly waterproofed so that the inside of the vehicle is not damaged. Recreational vehicle roofs can comprise an ethylene propylene diene rubber (EPDM) sheet that is glued to the roof top by an adhesive. However, these EPDM sheets can exhibit a loss of waterproofing properties as the sheets age. The EPDM sheets can cause an accumulation of dirt or debris that can damage or deface the recreational vehicle, and the EPDM sheets can exhibit significant chalking throughout the life of the sheets. Additionally, the EPDM sheets require a two step roofing process to apply the adhesive and subsequently apply the sheet.

Thus, there remains a need in the art for improved recreational vehicle roofing and methods of applying recreational vehicle roofing.

SUMMARY OF THE INVENTION

In accordance with embodiments of the present invention, recreational vehicle roofs or portions thereof are provided. The recreational vehicle roof can comprise a first substrate having a first surface. The first substrate is configured to form at least a portion of a recreational vehicle roof. The recreational vehicle roof can comprise a coating disposed proximate to at least a portion of the first surface of the first substrate. The coating comprises a polyurethane coating. The coating comprises a single layer coating that forms a waterproofing membrane, and the coating has a thickness of at least 10 mils. The coating has an elongation at break of at least about 50%, and he portion of the first surface of the substrate that is coated by the coating is substantially waterproof.

In some embodiments, the coating can have a first surface proximate to the first surface of the first substrate and a second surface, and the second surface of the coating can be free from contact with another layer. In other embodiments, the coating can have a first surface proximate to the first surface of the first substrate and a second surface, and the second surface of the coating can be free from contact with another layer comprising ethylene- propylene rubber. In one example, the first substrate can be wood, plywood, particle board, fiberboard, oriented strandboard chipboard, or medium density fiberboard. In another example, the first substrate can have a second surface, and the recreational vehicle roof can further have a second substrate proximate the second surface of the first substrate. In other embodiments, the second substrate can have first and second surfaces, and the first surface of the second substrate can be proximate to the second surface of the first substrate. Additionally, the second surface of the second substrate can be proximate to a first surface of a third substrate.

In some examples, the coating can coat the entire first surface of the substrate. In other examples, the coating can have a thickness of at least about 30 mils, at least about 30 mils to at least about 80 mils, or less than about 100 mils. In some embodiments, the coating has an elongation at beak of between about 50% to about 650% or between about 110% to about 400%.

In some embodiments, the coating can be a solvent based polyurethane coating. The solvent based polyurethane coating can be the reaction product of a composition comprising a first part and a second part. The first part can be about 50% to about 90% by weight of a urethane prepolymer formed from a polyol and an aliphatic isocyante and about 10% to about 50% by weight of at least one organic solvent, and the second part can be about 5% to about 30% by weight of an aromatic or aliphatic amine, about 30% to about 60% by weight of a thixotrope, and about 0% to about 20% by weight of a pigment dispersion.

In other embodiments, the coating can be a solvent free polyurethane coating. The solvent free polyurethane coating can be the reaction product of composition comprising a first part and a second part. The first part can be about 50% to about 90% by weight of a urethane prepolymer formed from a polyol and an aliphatic isocyante and about 0% to about 25% by weight of a diluent, and the second part can be about 5% to about 100% by weight of at least one aliphatic or aromatic amine. In other embodiments, the coating can be a water based coating.

In accordance with other embodiments of the present invention, recreational vehicles are provided. The recreational vehicles have a vehicle body and a roof on at least a portion of the vehicle body. The roof can be at least a first substrate having a waterproof membrane covering the first substrate. The waterproof membrane can be disposed such that the waterproof membrane is directly exposed to the atmosphere outside of the vehicle body, and the waterproof membrane can be a polyurethane coating. The polyurethane coating can comprise a single layer. The coating can have a thickness of at least 10 mils and an elongation at break of at least about 50%.

In some embodiments, the waterproof membrane is textured. In some examples, the coating has a thickness of between about 30 mils to about 100 mils and/or an elongation at break of between about 50% to about 650%. In some examples, the coating exhibits low tack and/or UV resistance. In some embodiments, the coating has a Shore A hardness of about 50 to about 90.

In accordance with other embodiments of the present invention methods of waterproofing recreational vehicle roofs are provided. The methods comprise applying a polyurethane coating to at least a portion of a recreational vehicle roof to form a waterproof membrane on the recreational vehicle roof. The coating has a thickness of at least 10 mils. The coating has an elongation at break of at least 50%, and the coating comprises a single layer that forms the waterproof membrane.

In some embodiments, the waterproof membrane has a first surface proximate to the roof and a second surface, and the second surface of the waterproof membrane is free from contact with another layer. In other embodiments, the waterproof membrane has a first surface proximate to the roof and a second surface, and the second surface of the waterproof membrane is free from contact with another layer comprising ethylene-propylene rubber.

In some examples, the step of applying a polyurethane coating comprises applying the coating such that the coating has a thickness of between about 10 mils to about 100 mils. In some embodiments the step of applying a polyurethane coating comprises applying the coating to cover each area of the recreational vehicle roof that will be exposed to weathering.

In some embodiments, the method further comprises installing the recreational vehicle roof on a recreational vehicle. For example, the step of installing the recreational vehicle roof can comprise providing the recreational vehicle roof in sections and installing each of the sections on the recreational vehicle. In other examples, the step of applying a polyurethane coating occurs prior to the step of installing the recreational vehicle roof. In another example, the step of applying a polyurethane coating occurs after the step of installing the recreational vehicle roof.

In some embodiments, the step of applying the polyurethane coating further comprises applying the polyurethane coating to the recreational vehicle roof and subsequently forming at least one opening in the recreational vehicle roof. In some embodiments, the step of applying the polyurethane coating further comprises forming at least one opening in the recreational vehicle roof and subsequently applying the polyurethane coating to the recreational vehicle roof. In some embodiments, the step of applying a polyurethane coating comprises mixing a first part of the coating composition with a second part of the coating composition, applying the mixture using a method selected from spraying, troweling, rolling, and knifing, and allowing the mixture to cure.

In accordance with other embodiments of the present invention coatings formed by processes comprising mixing a first part of a composition with a second part of a composition to form a coating having a thickness on a surface at least about 10 mils and having an elongation at break of at least about 50% is provided. The first part comprises about 50% to about 90% by weight of a urethane prepolymer formed from a polyol and an aliphatic isocyante and about 10% to about 50% by weight of at least one organic solvent. The second part comprises about 5% to about 30% by weight of an aromatic or aliphatic amine, about 30% to about 60% by weight of a thixotrope, and about 0% to about 20% by weight of a pigment dispersion.

In some examples, the first part comprises about 60% to about 80% by weight of the urethane prepolymer and about 20% about 40% by weight of the solvent, and the second part comprises about 10% to about 25% by weight of the amine and about 35% to about 50% by weight of the thixotrope. In other examples, the first part comprises about 67% to about 75% by weight of the urethane prepolymer and about 25% about 35% by weight of the solvent, and the second part comprises about 13% to about 19% by weight of the amine and about 38% to about 45% by weight of the thixotrope.

In some embodiments, the polyol can be a caprolactone polyol, a polyester polyol, a polyether polyol, and/or an acrylic polyol, and the aliphatic isocyanate can be dicyclohexylmethanediisocyanate, trimethylhexamethylenediisocyanate, hexane diisocyanate, m-tetramethylxylene diisocyanate, 1,4-tetramethylene diisocyanate, and isophorone diisocyanate.

In some examples, the amine can be isophorone diamine, hexamethylene diamine, a polyoxypropylene diamine, 2-methylpentane diamine, 3-propane diamine, 2-methyl-1,5-pentane diamine, p-amino cycolhexyl methane, diethyl toluene diamine, di-(methylthio)toluene diamine, N,N'-dimethylamino diphenylmethane, N,N'-diethylamino diphenylmethane, and toluene diamine. In some embodiments, the thixotrope can be an acrylic latex, polyurethane dispersions, styrene acrylic latexes, and vinyl acrylic latexes.

In accordance with other embodiments of the present invention coatings formed by processes comprising mixing a first part of a composition with a second part of a composition to form a coating having a thickness of at least about 10 mils on a surface and an elongation at break of at least about 50% are provided. The first part comprises about 50% to about 90% by weight of a urethane prepolymer formed from a polyol and an aliphatic isocyante and about 0% to about 25% by weight of at least one diluent. The second part comprises about 5% to about 100% by weight of an aromatic or aliphatic amine and about 0% to about 15% of a pigment dispersion.

In some examples, the second part comprises at least one polyoxypropylene diamine and at least one hindered aliphatic diamine. In other embodiments, the first part comprises about 60% to about 80% by weight of the urethane prepolymer and about 10% about 20% by weight of the diluent, and the second part comprises about 10% to about 50% by weight of the amine. In another example, the first part comprises about 67% to about 75% by weight of the urethane prepolymer and about 12% about 17% by weight of the diluent, and the second part comprises about 30% to about 45% by weight of the amine.

In some embodiments, the polyol can be a caprolactone polyol, a polyester polyol, a polyether polyol, and an acrylic polyol, and the aliphatic isocyanate can be dicyclohexylmethanediisocyanate, trimethylhexamethylenediisocyanate, hexane diisocyanate, m-tetramethylxylene diisocyanate, 1,4-tetramethylene diisocyanate, or isophorone diisocyanate. In some examples, the amine can be isophorone diamine, hexamethylene diamine, a polyoxypropylene diamine, 2-methylpentane diamine, 3-propane diamine, 2-methyl-1,5-pentane diamine, p-amino cycolhexyl methane, diethyl toluene diamine, di-(methylthio)toluene diamine, N,N'-dimethylamino diphenylmethane, N,N'-diethylamino diphenylmethane, ortoluene diamine. In further examples, the diluent can be propylene carbonate, ethylene carbonate, butylene carbonate, odorless mineral spirits, plasticizers, and combinations thereof.

BRIEF DESCRIPTION OF THE SEVERAL VIEWS OF THE DRAWINGS

The following detailed description of embodiments of the present invention can be best understood when read in conjunction with the following drawings, where like structure is indicated with like reference numerals and in which.

DETAILED DESCRIPTION OF EMBODIMENTS OF THE INVENTION

The present invention will now be described with occasional reference to the specific embodiments of the invention. This invention can, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are incorporated by reference in their entirety.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The present invention provides recreational vehicle roofing coatings, recreational vehicle roofs, and recreational vehicles. Additionally, methods of waterproofing a recreational vehicle roof are provided. The recreational vehicle roofing coatings can be polyurethane type coatings. The recreational vehicle roofing can have a single layer coating that forms a waterproofing membrane.

Figure 1:
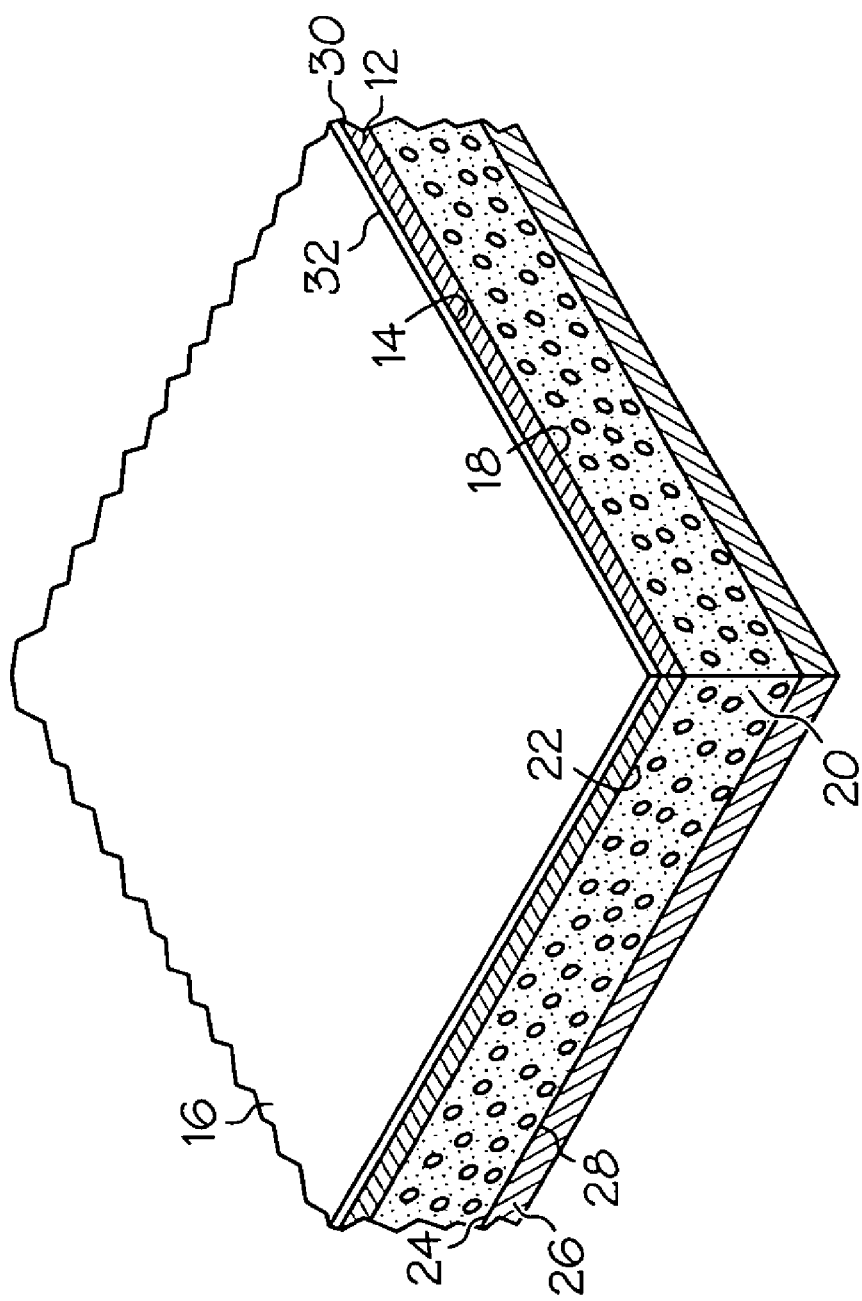
FIG. 1 is a cross section of a portion of recreational vehicle roof having a coating in accordance with the present invention.

Referring now to FIG. 1, a recreational vehicle roof 10 is illustrated. The roof 10 has a first substrate 12 having a first surface 14. The first substrate 12 is configured to form at least a portion of a recreational vehicle roof. It will be understood that the term "configured to form at least a portion of a recreational vehicle roof" refers to a substrate that forms a portion of recreational vehicle roof either before or after the recreational vehicle roof is installed on a recreational vehicle. It will be further understood that the term "configured to form a recreational vehicle roof" does not apply to a substrate before it has been configured into at least a portion of a recreational vehicle roof.

At least a portion of the first surface 14 of the first substrate 12 has a coating 16 disposed proximate to the first surface 14. The coating 16 can be directly in contact with the first surface 14, or the coating 16 can be coated on a layer or layers (not shown) disposed between the first surface 14 and the coating 16. The coating 16 is a polyurethane coating. It will be understood that the term "polyurethane coating" refers to a coating having linkages formed by the reaction of at least one isocyanate and at least one polyol and/or at least one polyamine. The coating 16 has a thickness of at least 10 mils, and an elongation at break of at least about 50%. In one example, the coating 16 can have a thickness of at least 10, 20, 30, 40, 50, 60, 70, 80, 90, or 100 mils. In another example, the coating 16 can have an elongation at break of at least 50, 100, 150, 200, 250, 300, 350, 400, 450, 500, 550, 600, 650 or 700%. The elongation at break can be measured in accordance with the ASTM D412 standard. The coating 16 can coat the entire first surface 14 of the first substrate 12 or only a portion of the first surface 14.

The coating 16 is a single layer coating that forms a waterproofing membrane. For purposes of defining and describing the present invention, the term "waterproofing membrane" shall be understood as referring to a layer that is capable of stopping or reducing the transfer or water or water vapor from one side of the layer to another side of the layer. The portion of the first surface 14 of the first substrate 12 that is coated by the coating 16 is substantially waterproof. For purposes of defining and describing the present invention, the term "substantially waterproof" shall be understood as referring to having reduced contact with water or water vapor under weathering conditions.

The first substrate 12 can be any suitable substrate that requires waterproofing for use in a recreational vehicle roof. For example, the first substrate 12 can be selected from wood, plywood, particle board, fiberboard, oriented strandboard, chipboard, medium density fiberboard, etc. The roof 10 can be any suitable recreational vehicle roof structure, and the roof 10 can be curved or uncurved. The roof 10 can have additional layers. A second substrate 20 can be disposed proximate to the second surface 18 of the first substrate 12. The second substrate 20 can be an insulating layer, such as a foam layer. The second substrate 20 can have a first surface 22 proximate to the second surface 18 of the first substrate 12, and the second substrate 20 can have a second surface 24 that is proximate to the first surface 28 of a third substrate 26. The third substrate 26 can be a substrate that forms the interior ceiling of the recreational vehicle. It will be understood that any suitable roof 10 can be used in conjunction with the coating 16 of the present invention to provide a roof 10 that is substantially waterproof.

The coating 16 can have a first surface 30 proximate to the first surface 14 of the first substrate 12. In one example, the coating 16 can have a second surface 32, and the second surface 32 can be free from contact with another layer comprising ethylene-propylene rubber (EPDM). In another example, the second surface 32 of the coating 16 can be free from contact with another layer. Therefore, the coating 16 can function as the waterproofing roofing on the recreational vehicle roof 10 without requiring another layer of waterproofing material.

The coating 16 can have any suitable properties. For example, the coating 16 can be textured. The coating 16 can exhibit low tack and UV resistance. For purposes of defining and describing the present invention, the term "low tack" shall be understood as referring to a coating having a surface characteristic such that at least some dust and dirt contamination on the surface can be removed through washing or scrubbing with water and a suitable detergent or soap. For purposes of defining and describing the present invention, the term "UV resistance" shall be understood as referring to a coating that exhibits at least some resistance to changes in surface texture, color, and/or physical properties in the presence of UV radiation. For example, the coating 16 can exhibit slight discoloration, no chalking, and no cracking under accelerated weathering of 2000 hours under a Xenon Arc lamp. The coating 16 can have a Shore A hardness of about 50 to about 90.

The coating 16 can have any suitable pot life. For example, the coating can have a pot life of about 10 seconds to about 10 minutes or about 3 minutes to about 5 minutes. The coating 16 can have any suitable skin time. For example, the coating can have a skin time of between about 3 seconds to about 10 minutes or between about 7 minutes to about 10 minutes at 75° F. and 50% relative humidity. The coating 16 may also have any suitable tensile properties. For example, the coating can have a tensile strength of between about 700 to about 3000 psi, a 100% modulus of between about 500 to about 2000 psi, and a tear strength of between about 300 to about 600 pli as measured using the ASTM D412 standard.

The coating 16 can comprise any suitable polyurethane coating. For example, the coating 16 can comprise a solvent free, solvent based, or water based polyurethane coating. Examples of suitable water based coatings are described in U.S. Pat. No. 6,214,450, which is incorporated by reference in its entirety herein.

Solvent Free Coating

In one example, the coating 16 is a solvent free two part urethane coating. The coating 16 is the reaction product of a composition comprising a first part and a second part. The first part of the composition is a urethane prepolymer formed from a polyol and an aliphatic isocyanate and a diluent. Any suitable polyol and aliphatic isocyanate may be used. For example, the polyol can be a caprolactone polyol, a polyester polyol, a polyether polyol, or an acrylic polyol and the aliphatic isocyanate may be, but is not limited to, dicyclohexylmethanediisocyanate, trimethylhexamethylenediisocyanate, hexane diisocyanate, m-tetramethylxylene diisocyanate, 1,4-tetramethylene diisocyanate, and isophorone diisocyanate. For purposes of defining and describing the present invention, the term "diluent" shall be understood as a component that may be used to reduce the viscosity of another component. Examples of suitable diluents include, but are not limited to, propylene carbonate, ethylene carbonate, butylene carbonate, odorless mineral spirits, plasticizers, and combinations thereof.

The second part of the composition is at least one aromatic or aliphatic amine crosslinker. Examples of suitable amines include, but are not limited to, isophorone diamine, hindered aliphatic diamines, hexamethylene diamine, a polyoxypropylene diamine, 2-methylpentane diamine, 3-propane diamine, 2-methyl-1,5-pentane diamine, p-amino cycolhexyl methane, diethyl toluene diamine, di-(methylthio)toluene diamine, N,N'-dimethylamino diphenylmethane, N,N'-diethylamino diphenylmethane, and toluene diamine.

Additionally, the second part of the composition can include a plasticizer, pigment dispersions, dispersing aids, freeze/thaw stabilizers, etc. Examples of suitable plasticizers include, but are not limited to, butyl benzyl phthalate, tricresylphosphate, triphenyl phosphate, butyl decyl phthalate, 1-Isopropyl-2,2 dimethyltrimethylene diisobutyrate, dioctyl phthalate, triisooctyl trimellitate, dioocyl adipate, and any other suitable phthalate and non-phthalate plasticizers. Examples of suitable dispersing aids include, but are not limited to Nuosperse 657 (Condea Servo LLC Piscataway, N.J.), BYK-104S (BYK-Chemie USA Wallingford, Conn.), and Disperbyk 190 (BYK-Chemie USA Wallingford, Conn.). Examples of suitable freeze/thaw additives include, but are not limited to, ethylene glycol, propylene glycol, glycerin, dipropylene glycol, and ethoxylated nonyl phenol. Examples of suitable pigment dispersion include, but are not limited to, titanium oxide and iron oxide pigments dispersed in plasticizer.

The first and second parts of the composition are mixed to form the coating 16. The coating 16 can be fast curing under normal temperature and humidity conditions. The first and second parts of the composition may be mixed in any suitable ratio. For example, the first and second parts of the composition may be mixed in a ratio between about 1:1 to a ratio of about 20:1 or a ratio of 2:1 or 5:1. The composition may be formulated so that the coating has a light color, such as white or off-white. The composition may have any suitable viscosity. For example, the first part may have a viscosity of between about 500 to about 1000 cps, and the second part may have a viscosity of between about 100 to about 300 cps. The composition may have an initial mixed viscosity of between about 2,000 to about 4,000 cps.

In one example, the coating 16 can be the reaction product of a composition comprising a first part comprising about 50% to about 90% by weight of a urethane prepolymer and about 0% to about 25% by weight of at least one diluent and a second part comprising about 5% to about 100% by weight of an aromatic or aliphatic amine and about 0% to about 15% of a pigment dispersion. In another example, the coating 16 can be the reaction product of a composition comprising a first part comprising about 60% to about 80% by weight of a urethane prepolymer and about 10% to about 20% by weight of a diluent and a second part comprising about 10% to about 50% by weight of an amine. In yet another example, the coating 16 can be the reaction product of a composition comprising a first part comprising about 67% to about 75% by weight of a urethane prepolymer and about 12% about 17% by weight of a diluent and a second part comprising about 30% to about 45% by weight of an amine. In a further example, the second part of the composition may comprise a polyoxypropylene diamine and a hindered aliphatic diamine. It will be understood that any suitable solvent free polyurethane coating composition may be used in conjunction with the present invention.

Solvent Based Coating

In another example, the coating 16 is a solvent based two part polyurethane coating. The coating 16 comprises the reaction product of a composition comprising a first part and a second part. The first part of the composition comprises a urethane prepolymer formed from a polyol and an aliphatic isocyanate and a solvent. Any suitable polyol and aliphatic isocyanate may be used. For example, the polyol can be a caprolactone polyol, a polyester polyol, a polyether polyol or an acrylic polyol and the aliphatic isocyanate may be dicyclohexylmethanediisocyanate, trimethylhexamethylenediisocyanate, hexane diisocyanate, m-tetramethylxylene diisocyanate, 1,4-tetramethylene diisocyanate, and isophorone diisocyanate. Any suitable solvent may be used. For example, the solvent may be an organic solvent such as xylene, t-butyl acetate, mineral spirits, toluene, acetone, mixed aromatic solvents or chlorinated solvents.

The second part of the solvent based composition comprises at least one aromatic or aliphatic amine crosslinker and at least one thixotrope. Examples of suitable amines include, but are not limited to, isophorone diamine, hindered aliphatic diamines, hexamethylene diamine, a polyoxypropylene diamine, 2-methylpentane diamine, 3-propane diamine, 2-methyl-1,5-pentane diamine, p-amino cycolhexyl methane, diethyl toluene diamine, di-(methylthio)toluene diamine, N,N'-dimethylamino diphenylmethane, N,N'-diethylamino diphenylmethane, and toluene diamine. Examples of suitable thixotropes include, but are not limited to, an acrylic latexes, polyurethane dispersions, styrene acrylic latexes or vinyl acrylic latexes.

Additionally, the second part solvent based of the composition can include a plasticizer, pigment dispersions, dispersing aids, freeze/thaw stabilizers, etc. Examples of suitable plasticizers include, but are not limited to, butyl benzyl phthalate, tricresylphosphate, triphenyl phosphate, butyl decyl phthalate, 1-Isopropyl-2,2 dimethyltrimethylene diisobutyrate, dioctyl phthalate, triisooctyl trimellitate, dioocyl adipate, and any other suitable phthalate and non-phthalate plasticizers. Examples of suitable dispersing aids include, but are not limited to Nuosperse 657 (Condea Servo LLC Piscataway, N.J.), BYK-104S (BYK Chemie USA Wallingford, Conn.), and Disperbyk 190 (BYK-Chemie USA Wallingford, Conn.). Examples of suitable freeze/thaw additives include, but are not limited to, ethylene glycol, propylene glycol, glycerin, dipropylene glycol, and ethoxylated nonyl phenol. Examples of suitable pigment dispersion include, but are not limited to, titanium oxide and iron oxide pigments dispersed in glycol. For example, Aquasperse II pigment dispersion from Degussa, Inc. could be used.

The first and second parts of the solvent based composition are mixed to form the coating 16. The coating 16 can be fast curing under normal temperature and humidity conditions. The first and second parts of the composition may be mixed in any suitable ratio. For example, the first and second parts of the composition may be mixed in a ratio between about 1:1 to a ratio of about 20:1 or a ratio of 2:1 or 5:1. The composition may be formulated so that the coating has a light color, such as white or off-white. The composition may have any suitable viscosity. For example, the first part may have a viscosity of between about 500 to about 1000 cps, and the second part may have a viscosity of between about 100 to about 300 cps. The composition may have an initial mixed viscosity of between about 2,000 to about 4,000 cps.

In one example, the coating 16 can be the reaction product of a composition comprising a first part comprising 50% to about 90% by weight of a urethane prepolymer and about 10% to about 50% by weight of at least one solvent and a second part comprising about 5% to about 30% by weight of an aromatic or aliphatic amine, about 30% to about 60% by weight of a thixotrope, and about 0% to about 20% of a pigment dispersion. In another example, the coating 16 can be the reaction product of a composition comprising a first part comprising about 60% to about 80% by weight of a urethane prepolymer and about 20% to about 40% by weight of at least one solvent and a second part comprising about 10% to about 25% by weight of an aromatic or aliphatic amine, about 35% to about 50% by weight of a thixotrope, and about 8% to about 17% of a pigment dispersion. In a further example, the coating 16 can be the reaction product of a composition comprising a first part comprising about 67% to about 75% by weight of a urethane prepolymer and about 25% to about 33% by weight of at least one solvent and a second part comprising about 13% to about 19% by weight of an aromatic or aliphatic amine, about 38% to about 45% by weight of a thixotrope, and about 10% to about 14% of a pigment dispersion. It will be understood that any suitable solvent based polyurethane coating composition may be used in conjunction with the present invention.

Figure 2:
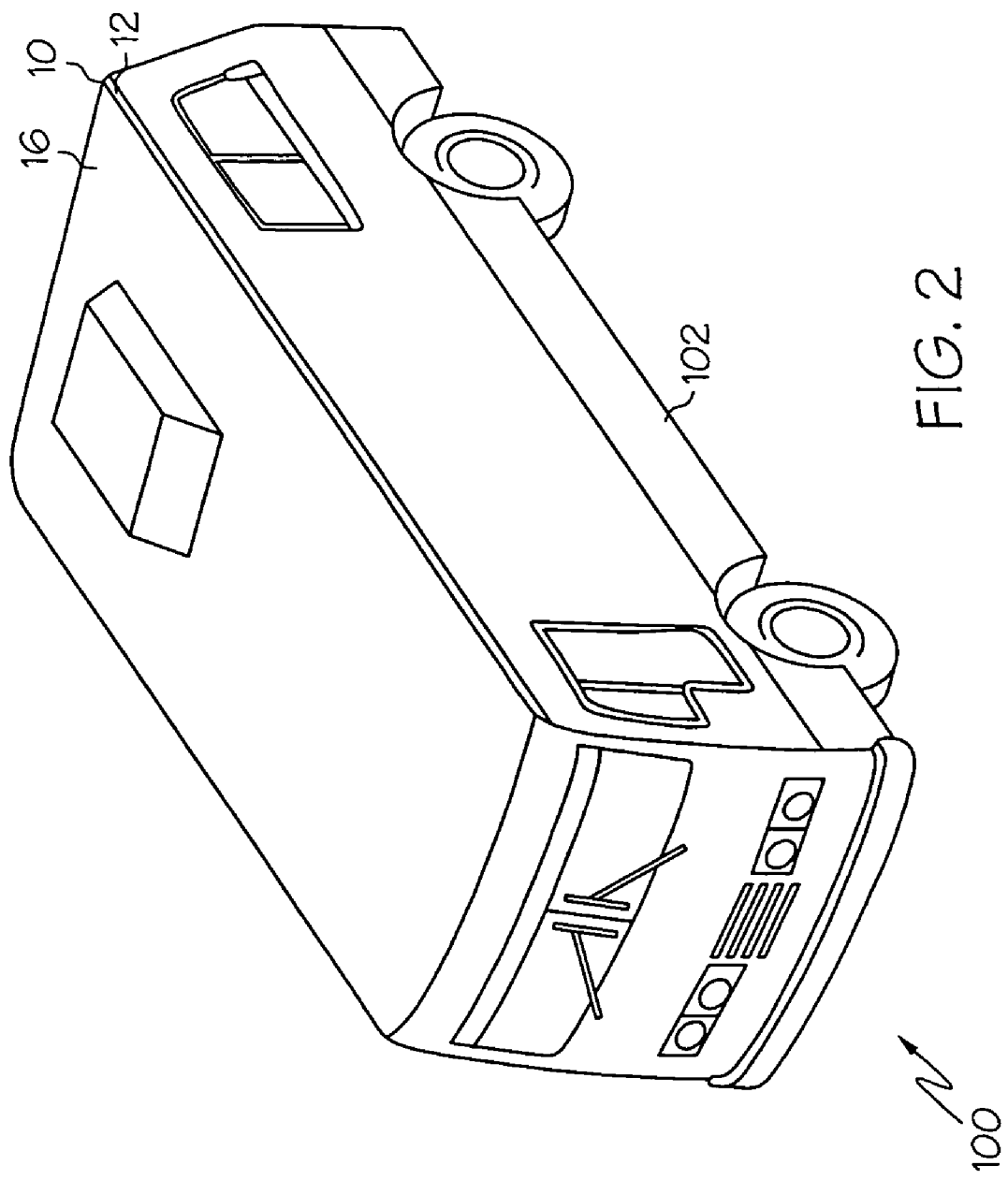
FIG. 2 is a plan view of a recreational vehicle having a recreational vehicle roof in accordance with the present invention.

Referring now to FIG. 2, a recreational vehicle 100 is illustrated. The recreational vehicle 100 has a vehicle body 102 and a roof 10 on at least a portion of the vehicle body 102. The roof 10 may comprise a first substrate 12 having a waterproof membrane 16 comprising a coating 16 as described herein. It will be understood that any suitable recreational vehicle may have a roof 10 provided in accordance with the present invention. The waterproof membrane 16 is disposed such that the waterproof membrane 16 is exposed to the atmosphere outside of the vehicle body 102. Therefore, the waterproof membrane 16 can function as the roofing material that protects the interior of the vehicle body 102 from the effects of weather such as rain or snow.

Methods of waterproofing a recreational vehicle roof are also provided. The methods include the step of applying a polyurethane coating to at least a portion of a recreational vehicle roof to form a waterproof membrane on the recreational vehicle roof. The polyurethane coating may be as described herein. The step of applying a polyurethane coating can include applying the coating to cover each are of the recreational vehicle roof that will be exposed to weathering. The step of applying the coating can comprise mixing a first part of the coating with a second part of the coating, applying the coating using any suitable method, and allowing the coating to cure. The coating may be applied using a method including, but not limited to, spraying, troweling, rolling, and knifing.

The methods can include the step of installing the recreational vehicle roof on a recreational vehicle. The recreational vehicle roof can be provided in sections, and each of the sections can be installed on the recreational vehicle. For example, the recreational vehicle roof can be provided in 8 foot by 20 foot sections that are installed to form the recreational vehicle roof. The roof can be installed either before or after the coating is applied to the recreational vehicle roof. Additionally, any suitable openings may be formed in the recreational vehicle roof either before or after the coating is applied and before or after the roof is installed on the recreational vehicle. For example, openings for a skylight, vent, etc. may be formed in the roof. It will be understood that the coating may be applied to the roof as part of the assembly process of the recreational vehicle in any suitable manner.

EXAMPLE 1

A two part coating solvent based polyurethane composition having the formulation shown below is provided.

| Material | Weight % |
| --- | --- |
| First Part | |
| Prepolymer of caprolactone polyol and IPDI | 70.0 |
| Solvent | 30.0 |
| Second Part | |
| Thixotrope | 41.5 |
| Diethyl toluene diamine crosslinker | 16.0 |
| Water | 21.9 |
| Pigment dispersion | 13.4 |
| Freeze/thaw additive | 6.9 |
| Secondary freeze/thaw stabilizer | 0.3 |

The solvent in the first part is xylene. The thixotrope is UCAR 123 Latex (Dow Chemical Midland, Mich.) which is a 62% solids acrylic latex. The diethyl toluene diamine crosslinker is Ethacure 100 (Albemarle Corp. Baton Rouge, La.). The pigment dispersion is Aquasphere II White (Degussa Corp. Parsippany, N.J.) which is an aqueous pigment paste. The freeze/thaw additive is propylene glycol. The secondary freeze/thaw stabilizer is Triton X-405 (Dow Chemical Midland, Mich.) an ethoxylated nonyl phenol.

The first and second parts are mixed in a 2:1 ratio to provide a coating having:

| | |
| --- | --- |
| Skin Time | 8-15 minutes |
| Tack Free Time | <20 minutes |
| Tensile Strength | 1500-3000 psi as measured according to ASTM D412 |
| Elongation | 80-250% as measured according to ASTM D412 |
| Weathering | Minimal yellowing, color fade or cracking after 3000 hours exposure in Q-UVB. |

EXAMPLE 2

A two part solvent free polyurethane coating having the composition shown below is provided.

| Material | Weight % |
|---|---|
| *First Part* | |
| Prepolymer of caprolactone polyol and IPDI | 70.0 |
| Diluent | 30.0 |
| *Second Part* | |
| Polyoxypropylene diamine crosslinkers | 34.5 |
| Hindered aliphatic diamine crosslinker | 39.1 |
| Plasticizer | 13.0 |
| Pigment | 12.8 |
| Dispersing aid | 0.3 |
| Secondary dispersing aid | 0.3 |

The diluent in the first part is 15.0% propylene carbonate and 15.0% Eastman TXIB plasticizer (Eastman Chemical Company Kingsport, Tenn.). The polyoxypropylene diamine crosslinkers are 7.8% Jeffamine T-5000 and 26.7% Jeffamine D-2000 (Huntsman Corp. Houston, Tex.). The hindered aliphatic diamine crosslinker is Jefflink 754 (Huntsman Corp.). The plasticizer is DIDP plasticizer. The pigment is titanium dioxide. The dispersing aid is Nuosperse 657 (Condea Servo LLC Piscataway, N.J.), and the secondary dispersing aid is soya lecithin.

The first and second parts are mixed in a 2:1 ratio to provide a coating having:

| | |
|---|---|
| Skin Time | <30 seconds |
| Tack Free Time | <5 minutes |
| Tensile Strength | 800-1400 psi as measured according to ASTM D412 |
| Elongation | 300-500% as measured according to ASTM D412 |
| Weathering | No yellowing, color fade or cracking after 3000 hours exposure in Q-UVB. |

EXAMPLE 3

A two part solvent free polyurethane coating having the composition shown below is provided.

| Material | Weight % |
|---|---|
| *First Part* | |
| Prepolymer of caprolactone polyol and IPDI | 70.0 |
| Diluent | 30.0 |
| *Second Part* | |
| Polyoxypropylene diamine crosslinkers | 68.3 |
| Hindered aliphatic diamine crosslinker | 12.4 |
| Plasticizer | 13.0 |
| Pigment | 5.0 |
| Isophorone diamine crosslinker | 1.0 |
| Secondary dispersing aid | 0.3 |

The diluent in the first part is 15.0% propylene carbonate and 15.0% Eastman TXIB (Eastman Chemical Company Kingsport, Tenn.) plasticizer. The polyoxypropylene diamine crosslinkers are 8.8% Jeffamine T-5000 and 59.5% Jeffamine D-2000 (Huntsman Corp. Houston, Tex.). The hindered aliphatic diamine crosslinker is Jefflink 754 (Huntsman Corp.). The plasticizer is DIDP plasticizer. The pigment is titanium dioxide. The secondary dispersing aid is soya lecithin.

The first and second parts are mixed in a 1:1 ratio to provide a coating having:

| | |
|---|---|
| Skin Time | <30 seconds |
| Tack Free Time | <15 minutes |
| Tensile Strength | 700-1000 psi as measured according to ASTM D412 |
| Elongation | 300-600% as measured according to ASTM D412 |
| Weathering | No yellowing, color fade or cracking after 3000 hours exposure in Q-UVB. |

The present invention should not be considered limited to the specific examples described above, but rather should be understood to cover all aspects of the invention. Various modifications, equivalent processes, as well as numerous structures and devices to which the present invention may be applicable will be readily apparent to those skilled in the art.

It will be obvious to those skilled in the art that various changes may be made without departing from the scope of the invention, which is not to be considered limited to what is described in the specification.

What is claimed is:

1. A recreational vehicle roof comprising a layer of a rigid non-waterproof material, at least a portion of the layer having a coating formed from a solvent based polyurethane:
   exhibiting an elongation at break of at least about 50%;
   wherein the polyurethane coating forms a waterproof membrane capable of stopping the transfer of water vapor, having a thickness of at least 10 mils.

2. The recreational vehicle roof as claimed in claim 1 wherein said solvent based polyurethane coating comprises the reaction product of a composition comprising a first part and a second part wherein:
   said first part comprises about 50% to about 90% by weight of a urethane prepolymer formed from a polyol and an aliphatic isocyanate and about 10% to about 50% by weight of at least one organic solvent; and
   said second part comprises about 5% to about 30% by weight of an aromatic or aliphatic amine, about 30% to about 60% by weight of a thixotrope, and about 0% to about 20% by weight of a pigment dispersion.

3. The recreational vehicle roof of claim 1, wherein the rigid non-water proof material is formed from wood or a wood product.

4. The recreational vehicle roof of claim 3, wherein the rigid non-water proof material is formed from at least one of wood, plywood, particle board, fiberboard, oriented strandboard, chipboard, and medium density fiberboard.

5. A recreational vehicle roof comprising a layer of a rigid non-waterproof material, at least a portion of the layer having a coating formed from a solvent free polyurethane:
   exhibiting an elongation at break of at least about 50%;
   wherein the polyurethane coating forms a waterproof membrane capable of stopping the transfer of water vapor, having a thickness of at least 10 mils.

6. The recreational vehicle roof as claimed in claim 5 wherein said solvent free polyurethane coating comprises the reaction product of a composition comprising a first part and a second part wherein:

said first part comprises about 50% to about 90% by weight of a urethane pre-polymer formed from a polyol and an aliphatic isocyanate and about 0% to about 25% by weight of a diluent; and said second part comprises about 5% to about 100% by weight of at least one aliphatic or aromatic amine.

7. The recreational vehicle roof of claim 5, wherein the rigid non-water proof material is formed from wood or a wood product.

8. The recreational vehicle roof of claim 7, wherein the rigid non-water proof material is formed from at least one of wood, plywood, particle board, fiberboard, oriented strandboard, chipboard, and medium density fiberboard.

9. A recreational vehicle roof comprising a layer of a rigid non-waterproof material, at least a portion of the layer having a coating formed from a water based polyurethane exhibiting an elongation at break of at least about 50%; wherein the polyurethane coating forms a waterproof membrane capable of stopping the transfer of water vapor, having a thickness of at least 10 mils.

10. The recreational vehicle roof of claim 9, wherein the rigid non-water proof material is formed from wood or a wood product.

11. The recreational vehicle roof of claim 10, wherein the rigid non-water proof material is formed from at least one of wood, plywood, particle board, fiberboard, oriented strandboard, chipboard, and medium density fiberboard.

12. A recreational vehicle, comprising:

a vehicle body; and a roof on at least a portion of said vehicle body, wherein the roof or portion thereof is made from a layer of non-waterproof material and at least a portion of the layer is coated with a substantially waterproof polyurethane coating, wherein:

the polyurethane coating comprises a single layer coating that forms a waterproofing membrane;

the polyurethane coating has a thickness of at least 10 mils;

the polyurethane coating has an elongation at break of at least about 50%; and the polyurethane coating has a Shore A hardness of about 50 to about 90; and wherein the portion of the recreational vehicle roof that is coated by the polyurethane coating is substantially waterproof.

13. A method of waterproofing a recreational vehicle roof comprising a layer of a rigid non-waterproof material, the method comprising:

applying a single coating of a polyurethane exhibiting an elongation at break of at least 50% to at least a portion of the layer of rigid non-waterproof material to form a waterproof membrane at least 10 mils thick on the layer of rigid non-waterproof material, wherein the waterproof membrane is capable of stopping the transfer of water vapor, and disposed such that the waterproof membrane is directly exposed to the atmosphere outside of the recreational vehicle roof;

subsequently forming at least one opening in the recreational vehicle roof, and installing the recreational vehicle roof on a recreational vehicle.

14. A method of waterproofing a recreational vehicle roof comprising a layer of a rigid non-waterproof material, the method comprising:

forming at least one opening in the recreational vehicle roof;

subsequently applying a single coating of a polyurethane exhibiting an elongation at break of at least 50% to at least a portion of the layer of rigid non-waterproof material to form a waterproof membrane at least 10 mils thick on the layer of rigid non-waterproof material, wherein the waterproof membrane is capable of stopping the transfer of water vapor, and disposed such that the waterproof membrane is directly exposed to the atmosphere outside of the recreational vehicle roof; and installing said recreational vehicle roof on a recreational vehicle.

15. A method of waterproofing a recreational vehicle roof containing a layer of a rigid non-waterproof material, the method comprising:

mixing a first part of a polyurethane composition with a second part of a polyurethane composition to form a mixture, wherein the polyurethane within the mixture exhibits an elongation at break of at least 50%;

applying the mixture using a method selected from spraying, troweling, rolling, and knifing, wherein the mixture is applied to at least a portion of the layer of rigid non-waterproof material to form a waterproof membrane at least 10 mils thick on the layer of rigid non-waterproof material, wherein the waterproof membrane is capable of stopping the transfer of water vapor; and allowing the mixture to cure.

* * * * *